(12) United States Patent
Yoneyama et al.

(10) Patent No.: US 8,745,156 B2
(45) Date of Patent: Jun. 3, 2014

(54) COMMUNICATION DEVICE, HOST DEVICE, COMMUNICATION CONTROL METHOD, AND COMPUTER PROGRAM PRODUCT FOR TRANSMITTING FILE

(75) Inventors: Seijiro Yoneyama, Kanagawa (JP); Tomoya Horiguchi, Tokyo (JP); Kotaro Ise, Kanagawa (JP); Kiyoshi Toshimitsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 13/222,109

(22) Filed: Aug. 31, 2011

(65) Prior Publication Data

US 2012/0166577 A1 Jun. 28, 2012

(30) Foreign Application Priority Data

Dec. 28, 2010 (JP) ................................. 2010-292333

(51) Int. Cl.
*G06F 15/16* (2006.01)
(52) U.S. Cl.
USPC ......................................................... 709/217

(58) Field of Classification Search
USPC ................................... 709/203, 217, 250, 206
See application file for complete search history.

(56) References Cited

U.S. PATENT DOCUMENTS

| 8,325,625 | B2* | 12/2012 | Nair et al. ...................... 370/254 |
| 2005/0216580 | A1* | 9/2005 | Raji et al. ...................... 709/223 |
| 2013/0080692 | A1* | 3/2013 | Feinberg et al. ............... 711/103 |

FOREIGN PATENT DOCUMENTS

JP 2010-067060 3/2010

* cited by examiner

*Primary Examiner* — Joshua Joo
(74) *Attorney, Agent, or Firm* — Amin, Turocy & Watson, LLP

(57) ABSTRACT

According to an embodiment, a communication device connected to a host device includes a wireless communication unit and a communication control unit. The communication control unit controls the wireless communication unit to transmit a file which is stored in a storage unit of the communication device by the host device to a transmission destination corresponding to a type of the host device and a type of the communication device using wireless communication.

18 Claims, 8 Drawing Sheets

COMMUNICATION DEVICE, HOST DEVICE, COMMUNICATION CONTROL METHOD, AND COMPUTER PROGRAM PRODUCT FOR TRANSMITTING FILE

CROSS-REFERENCE TO RELATED APPLICATIONS

This application is based upon and claims the benefit of priority from Japanese Patent Application No. 2010-292333, filed on Dec. 28, 2010; the entire contents of which are incorporated herein by reference.

FIELD

Embodiments described herein relate generally to a communication device, a host device, a communication control method, and a computer program product.

BACKGROUND

In recent years, memory cards having a wireless communication interface, such as IEEE802.11 or TransferJet (registered trademark), a storage interface, such as SDHC or SDXC, and a host interface, such as USB or SDIO, have been known.

When such a memory card is used as a storage unit of a host device, it is possible to automatically transmit the file stored in the memory card by the host device to a predetermined transmission destination using the wireless communication function of the memory card.

However, in the related art described above, the transmission destination of the file is determined on the basis of the memory card, but the host device is not considered in determining the transmission destination.

DETAILED DESCRIPTION

According to an embodiment, a communication device connected to a host device includes a wireless communication unit; and a communication control unit configured to control the wireless communication unit to transmit a file, which is stored in a storage unit of the communication device by the host device, to a transmission destination corresponding to a type of the host device and a type of the communication device using wireless communication.

Various embodiments will be described hereinafter with reference to the accompanying drawings.

First Embodiment

Figure 1:
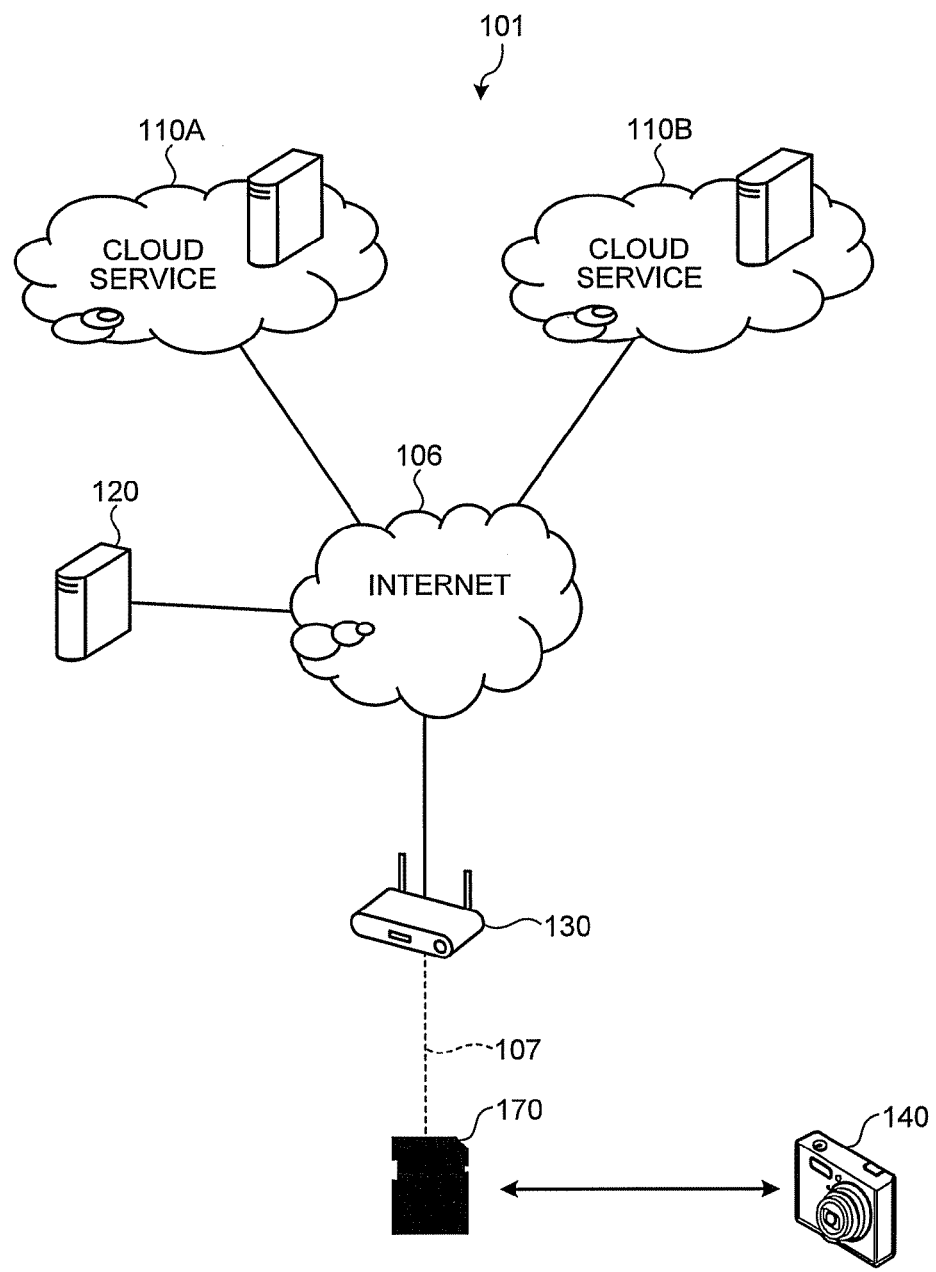
FIG. 1 is a block diagram illustrating an example of the structure of a communication system according to a first embodiment.

FIG. 1 is a block diagram illustrating an example of the structure of a communication system 101 according to a first embodiment. As shown in FIG. 1, the communication system 101 includes cloud services 110A and 110B, a relay server 120, a wireless base station 130, a host device 140, and a memory card 170.

The cloud services 110A and 110B, the relay server 120, and the wireless base station 130 are connected to each other through the Internet 106. The wireless base station 130 and the memory card 170 are connected to each other through a wireless link 107. The host device 140 and the memory card 170 are capable of being physically connected to each other.

The cloud services 110A and 110B provide various kinds of services (computer processing), such as a storage service, through the Internet 106 and are implemented by various kinds of computers, such as servers. In the following description, when it is not necessary to discriminate the cloud services 110A and 110B, in some cases, the cloud services 110A and 110B are simply referred to as a cloud service 110.

The relay server 120 relays the cloud service 110. That is, the cloud service 110 is provided through the relay server 120.

The wireless base station 130 wirelessly communicates with the memory card 170 through the wireless link 107 and relays the connection of the memory card 170 to the Internet 106.

The host device 140 (an example of a host device) includes an interface capable of being connected to the memory card 170 and writes (stores) or reads files to or from the memory card 170 which is connected thereto through the interface. In the first embodiment, an example in which the host device 140 is a digital camera will be described, but the embodiment is not limited thereto.

The memory card 170 (an example of a communication device) is a storage device having a wireless communication function. The memory card 170 uploads the file, which has been stored by the host device 140 in the memory card 170, to the cloud service 110 through the wireless link 107, the wireless base station 130, the Internet 106, and the relay server 120 using the wireless communication function.

Figure 2:
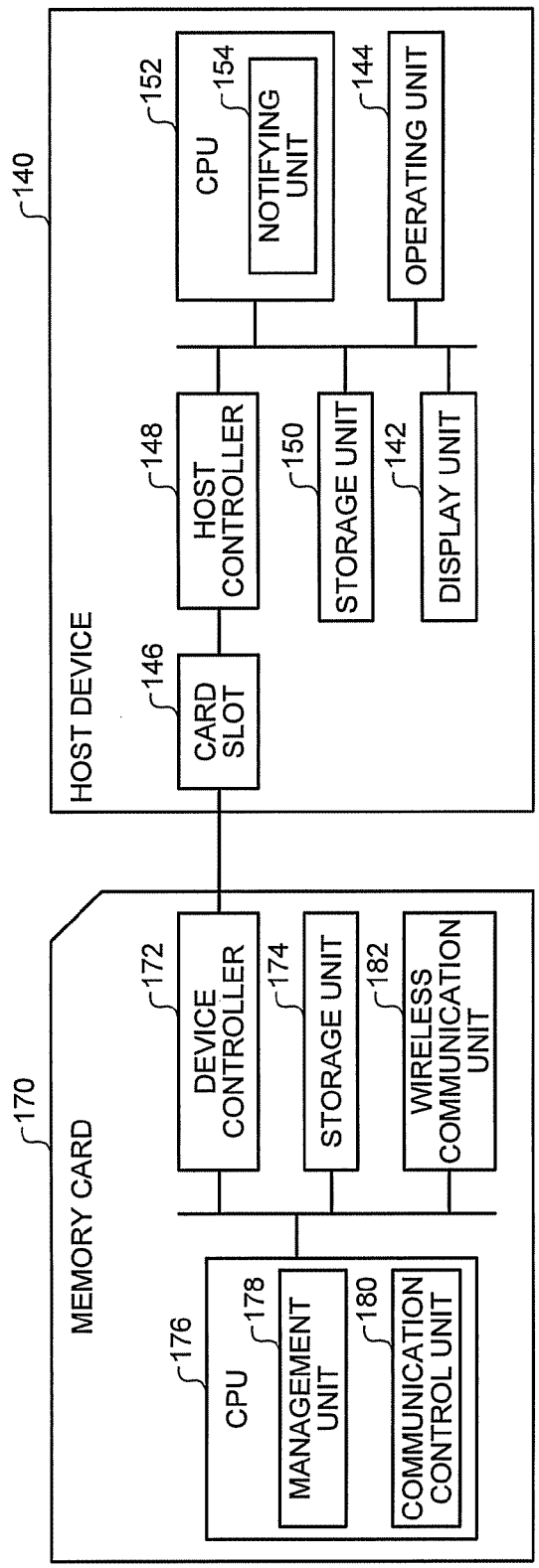
FIG. 2 is a block diagram illustrating an example of the structure of a host device and a memory card according to the first embodiment.

FIG. 2 is a block diagram illustrating an example of the structure of the host device 140 and the memory card 170 according to the first embodiment. As shown in FIG. 2, the host device 140 includes, for example, a display unit 142, an operating unit 144, a card slot 146, a host controller 148, a storage unit 150, and a CPU 152.

The display unit 142 displays various kinds of screens and may be the existing display device, such as a liquid crystal display or a touch panel display.

The operating unit 144 receives inputs of various kinds of operations and may be at least one of the existing input devices, such as a key switch and a touch panel display. The display unit 142 and the operating unit 144 may be integrated into, for example, a touch panel display.

The card slot 146 is an insertion hole into which the memory card 170 is inserted and is a communication interface between the host device 140 and the memory card 170.

The host controller 148 detects the memory card 170 mounted (inserted) into the card slot 146. Then, the host controller 148 controls communication with the memory card 170 inserted into the card slot 146, and controls the writing (storage) of files or data to the memory card 170 through the card slot 146 and the reading of files or data from the memory card 170 through the card slot 146. For example, the host controller 148 stores a file of still images or moving images, such as pictures captured by an imaging unit (not shown), in the memory card 170 through the card slot 146.

The storage unit 150 stores therein, for example, various kinds of programs, such as firmware, executed by the host device 140 or data used for various kinds of processes performed by the host device 140. The storage unit 150 may be at least one of the existing storage devices capable of magnetically, optically, or electrically storing data, such as a hard disk drive (HDD), a solid state drive (SSD), a read only memory (ROM), and a random access memory (RAM).

The storage unit 150 stores therein first type information of the host device 140. The first type information is information indicating the type of host device and corresponds to, for example, the model number or serial number of the host device. However, the first type information is not limited thereto. For example, any information may be used as the first type information as long as it can specify the type of host device.

The CPU 152 is a processor that controls each unit included in the host device 140. Specifically, the CPU 152 expands (loads) the firmware stored in the storage unit 150 to the work area of the storage unit 150 and executes the firmware to control each unit included in the host device 140. For example, when receiving a transmission destination list from the memory card 170 through the card slot 146 and the host controller 148, the CPU 152 displays the received transmission destination list on the display unit 142. In addition, for example, when the user uses the operating unit 144 to select a transmission destination from the transmission destination list displayed on the display unit 142, the CPU 152 transmits transmission destination information indicating the selected transmission destination to the memory card 170 through the host controller 148 and the card slot 146. In the first embodiment, the transmission destination is the cloud service 110 to which the file stored in the memory card 170 is uploaded, but the embodiment is not limited thereto. The CPU 152 includes a notifying unit 154.

The notifying unit 154 notifies the memory card 170 of the first type information of the host device 140. Specifically, when the host controller 148 detects the memory card 170 inserted into the card slot 146, the notifying unit 154 reads the first type information of the host device 140 from the storage unit 150 and notifies the memory card 170 of the first type information through the host controller 148 and the card slot 146.

The process performed by the CPU 152 may be implemented by hardware.

As shown in FIG. 2, the memory card 170 includes a device controller 172, a storage unit 174, a CPU 176, and a wireless communication unit 182.

When the memory card 170 is inserted into the card slot 146 of the host device 140, the device controller 172 controls communication with the host device 140 and controls the writing (storage) of files or data from the host device 140 into the memory card and the reading of files or data from the memory card onto the host device 140. For example, when the host device 140 stores a file of still images or moving images, such as pictures, the device controller 172 stores the file in the storage unit 174.

The storage unit 174 stores therein, for example, various kinds of programs, such as firmware, executed by the memory card 170 or data used for various kinds of processes performed by the memory card 170. The storage unit 174 may be at least one of the existing storage devices including a volatile memory, such as a dynamic random access memory (DRAM), and a nonvolatile memory, such as a non-volatile RAM (NVRAM).

The storage unit 174 stores second type information of the memory card 170. The second type information is information indicating the type of memory card and corresponds to, for example, the model number or serial number of the memory card. However, the second type information is not limited thereto. For example, any information may be used as the second type information as long as it can specify the type of memory card.

In addition, the storage unit 174 stores therein a table in which the first type information, the second type information, and transmission destination information indicating transmission destinations corresponding to the first type information and the second type information are associated with each other. As described above, the transmission destination indicates the cloud service 110 to which the file stored in the memory card 170 is uploaded, but the embodiment is not limited thereto.

The CPU 176 is a processor that controls each unit included in the memory card 170. Specifically, the CPU 176 expands (loads) the firmware stored in the storage unit 174 to the work area of the storage unit 174 and executes the firmware to control each unit included in the memory card 170. For example, the CPU 176 includes a management unit 178 and a communication control unit 180.

The management unit 178 receives the first type information of the host device 140 and determines whether the received first type information has been registered in the table of the storage unit 174. Specifically, when the memory card 170 is inserted into the card slot 146 of the host device 140, the management unit 178 receives the first type information of the host device 140 from the host device 140 through the device controller 172.

When the first type information of the host device 140 has not been registered in the table of the storage unit 174, the management unit 178 generates a transmission destination list on the basis of the first type information of the host device 140 and the second type information of the memory card 170. An example of a method of generating the transmission destination list will be described below. Then, the management unit 178 transmits the generated transmission destination list to the host device 140 through the device controller 172 and receives, from the host device 140, transmission destination information indicating a transmission destination which is selected from the transmitted transmission destination list by the host device. In addition, the management unit 178 registers the received transmission destination information in the table of the storage unit 174 so as to be associated with the first type information of the host device 140 and the second type information of the memory card 170.

The communication control unit 180 controls the wireless communication unit 182 to transmit the file, which has been stored by the host device 140 in the storage unit 174, to a transmission destination corresponding to the type of the host device 140 and the type of the memory card 170 using wireless communication. Specifically, the communication control unit 180 controls the wireless communication unit 182 to transmit the file, which has been stored by the host device 140 in the storage unit 174, to the transmission destination (cloud service 110) indicated by the transmission destination information corresponding to the first type information of the host device 140 and the second type information of the memory card 170 using wireless communication.

The wireless communication unit 182 is controlled by the communication control unit 180 to transmit the file, which has been stored by the host device 140 in the storage unit 174, to the transmission destination indicated by the transmission destination information corresponding to the first type information of the host device 140 and the second type information of the memory card 170 using wireless communication.

The process performed by the CPU 176 may be implemented by hardware.

Next, an example of the method of generating the transmission destination list will be described.

The management unit 178 acquires a first transmission destination list corresponding to the first type information of the host device 140 and a second transmission destination list corresponding to the second type information of the memory card 170. For example, the first transmission destination list and the second transmission destination list may be stored in advance in the storage unit 174 and the management unit 178 may acquire the first transmission destination list and the second transmission destination list from the storage unit 174. In addition, for example, the management unit 178 may acquire the first transmission destination list and the second transmission destination list from the Internet 106 or the relay server 120 through the wireless communication unit 182. Alternatively, for example, the management unit 178 may acquire one (for example, the first transmission destination list) of the first and second transmission destination lists from the storage unit 174 and may acquire the other transmission destination list (for example, the second transmission destination list) from the Internet 106.

For example, the management unit 178 adds the transmission destinations included in the acquired first and second transmission destination lists to generate a transmission destination list. For example, the management unit 178 may extract the transmission destinations commonly included in both the acquired first and second transmission destination lists to generate a transmission destination list. In addition, for example, the management unit 178 may use the acquired first transmission destination list as a transmission destination list and may use the acquired second transmission destination list as a transmission destination list. For example, when the transmission destination is associated with priority in the acquired first and second transmission destination lists, the management unit 178 may generate a transmission destination list of the transmission destinations with a predetermined priority or higher. For example, the management unit 178 may authenticate the first type information of the host device 140 received from the host device 140. When the authentication succeeds, the management unit 178 may use the first transmission destination list to generate the transmission destination list. In this case, first type information for authentication may be stored in the storage unit 174 in advance and the management unit 178 may authenticate the first type information of the host device 140 received from the host device 140 on the basis of the first type information for authentication.

Figure 3:
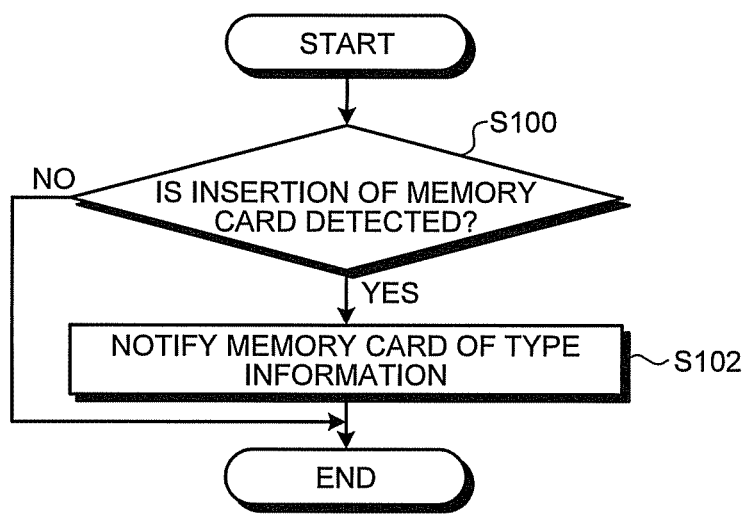
FIG. 3 is a flowchart illustrating an example of a notification process of the host device according to the first embodiment.

FIG. 3 is a flowchart illustrating an example of the flow of a notification process performed by the host device 140 according to the first embodiment.

First, when the memory card 170 is inserted into the card slot 146 of the host device 140, the host controller 148 detects the insertion of the memory card 170 (Step S100).

When the insertion of the memory card 170 is detected (Yes in Step S100), the notifying unit 154 notifies the memory card 170 of the first type information of the host device 140 through the host controller 148 and the card slot 146 (Step S102).

In contrast, when the insertion of the memory card 170 is not detected (No in Step S100), the notifying unit 154 does not perform notification of Step S102.

Figure 4:
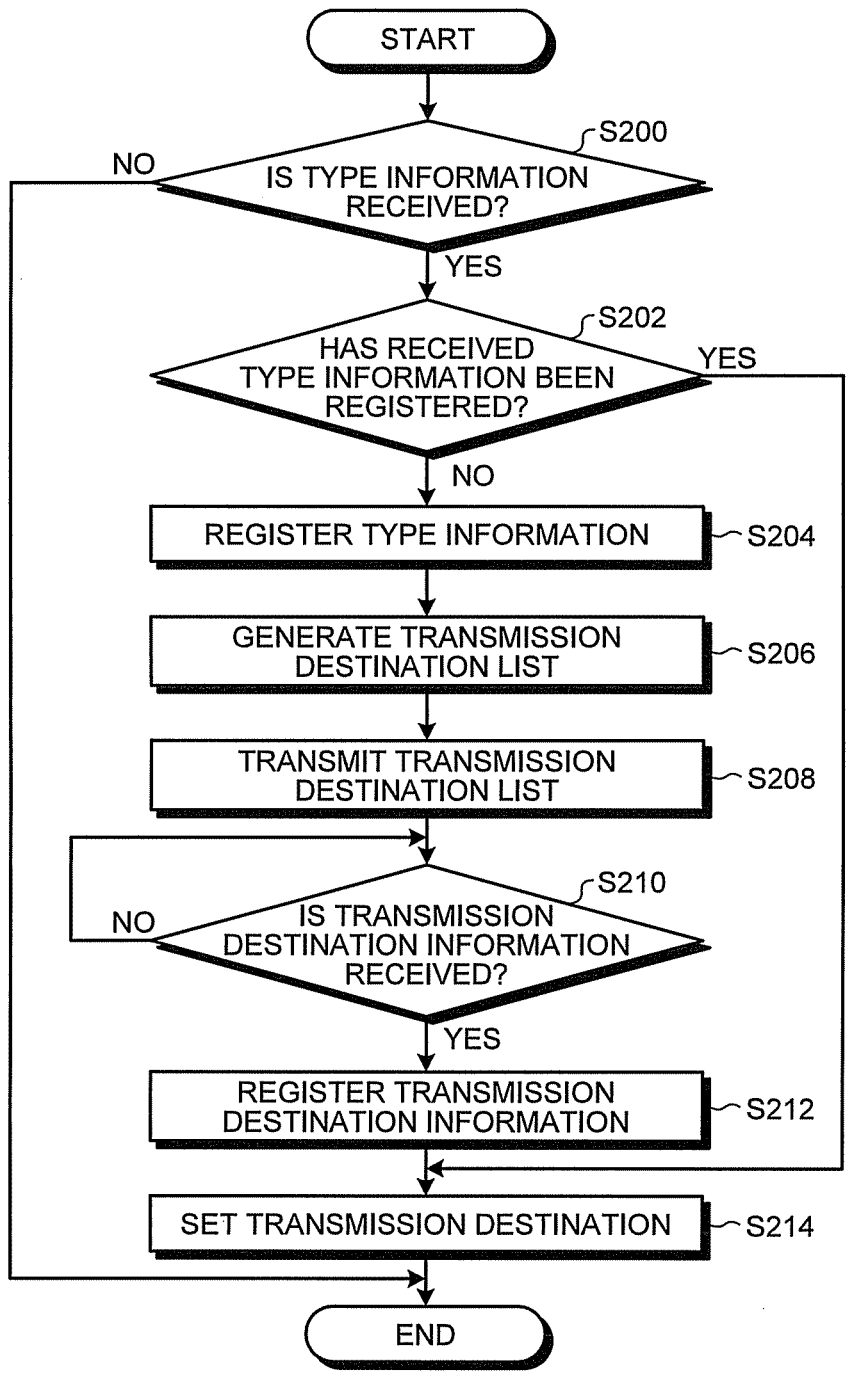
FIG. 4 is a flowchart illustrating an example of a registration process of the memory card according to the first embodiment.

FIG. 4 is a flowchart illustrating an example of the flow of a registration process performed by the memory card 170 according to the first embodiment.

First, when receiving the first type information of the host device 140 from the host device 140 through the device controller 172 (Yes in Step S200), the management unit 178 determines whether the received first type information has been registered in the table of the storage unit 174 (Step S202).

When the received first type information has not been registered in the table of the storage unit 174 (No in Step S202), the management unit 178 registers the received first type information and the second type information of the memory card 170 in the table of the storage unit 174 so as to be associated with each other (Step S204). In contraset, when the received first type information has been registered in the table of the storage unit 174 (Yes in Step S202), the process proceeds to Step S214.

Then, the management unit 178 generates a transmission destination list on the basis of the first type information and the second type information registered in the table of the storage unit 174 (Step S206) and transmits the transmission destination list to the host device 140 through the device controller 172 (Step S208).

Then, the management unit 178 waits for the reception of the transmission destination information indicating the transmission destination selected from the transmitted transmission destination list by the host device 140 (No in Step S210). Then, when receiving the transmission destination information from the host device 140 (Yes in Step S210), the management unit 178 registers the received transmission destination information in the table of the storage unit 174 so as to be associated with the first type information of the host device 140 and the second type information of the memory card 170 (Step S212).

Then, the communication control unit 180 notifies the relay server 120 of the transmission destination indicated by the transmission destination information which corresponds to the first type information of the host device 140 and the second type information of the memory card 170 through the wireless link 107, the wireless base station 130, and the Internet 106 and sets transmission to the cloud service 110 (Step S214).

When the first type information of the host device 140 is not received (No on Step S200), the management unit 178 ends the process.

Figure 5:
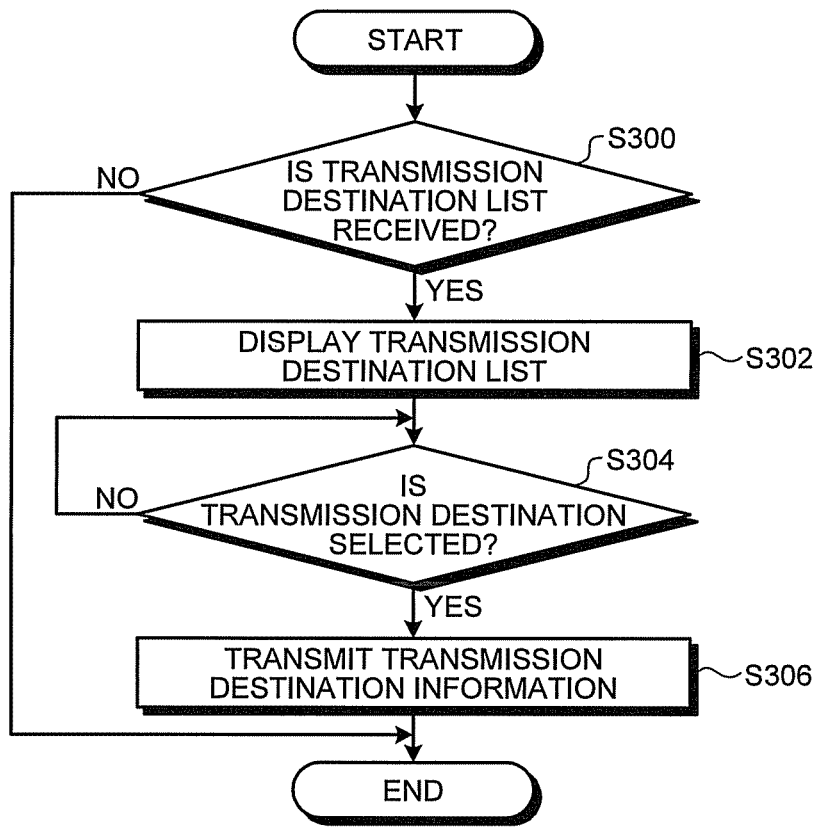
FIG. 5 is a flowchart illustrating an example of a selection process of the host device according to the first embodiment.

FIG. 5 is a flowchart illustrating an example of the flow of a selection process performed by the host device 140 according to the first embodiment.

First, when the transmission destination list is received from the memory card 170 through the card slot 146 and the host controller 148 (Yes in Step S300), the CPU 152 displays the received transmission destination list on the display unit 142 (Step S302). In this case, when the transmission destination is associated with priority in the transmission destination list, the CPU 152 displays the transmission destination list on the display unit 142 such that the transmission destination with higher priority is more noticeable. For example, the CPU 152 displays the transmission destination list on the display unit 142 such that the transmission destination with higher priority is displayed with a larger font, in a more noticeable color, or with a larger logotype, or the transmission destination with higher priority ranks higher in the list.

Then, the CPU 152 waits for the user to select a transmission destination from the transmission destination list displayed on the display unit 142 using the operating unit 144 (No in Step S304). Then, when the user uses the operating unit 144 to select a transmission destination (Yes in Step S304), the CPU 152 notifies the memory card 170 of the transmission destination information indicating the selected transmission destination through the host controller 148 and the card slot 146 (Step S306).

When the transmission destination list is not received (No in Step S300), the CPU 152 ends the process.

Figure 6:
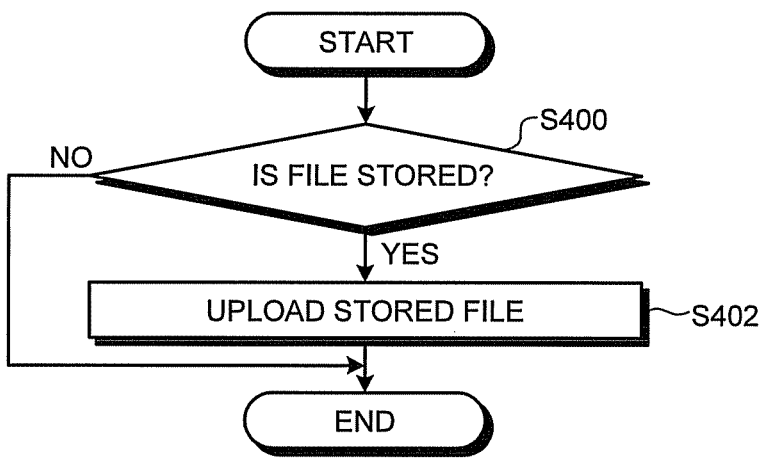
FIG. 6 is a flowchart illustrating an example of a transmission process of the memory card according to the first embodiment.

FIG. 6 is a flowchart illustrating an example of the flow of a transmission process performed by the memory card 170 according to the first embodiment.

First, the communication control unit 180 checks whether a file is stored in the storage unit 174 through the device controller 172 by the host device 140 (Step S400).

When a file is stored in the storage unit 174 (Yes in Step S400), the communication control unit 180 controls the wireless communication unit 182 to transmit (upload) the file stored in the storage unit 174 to the transmission destination indicated by the transmission destination information which corresponds to the first type information of the host device 140 and the second type information of the memory card 170 using wireless communication (Step S402).

When no file is stored in the storage unit 174 (No in Step S400), the communication control unit 180 ends the process.

As described above, according to the first embodiment, it is possible to transmit the file stored in the memory card by the host device to the transmission destination (cloud service) which is determined in consideration of the host device as well as the memory card.

In addition, according to the first embodiment, the user can select a transmission destination (cloud service) from the transmission destination list on the basis of the first transmission destination list corresponding to the host device and the second transmission destination list corresponding to the memory card. Therefore, it is possible to provide a wide selection of transmission destinations.

According to the first embodiment, it is possible to dynamically change the transmission destination (cloud service) corresponding to the host device and the memory card only by connecting the host device and the memory card. Therefore, it is possible to reduce the work load of the user.

For example, it is assumed that the cloud service 110A is registered in the table of the storage unit 174 so as to be associated with the host device 140 and the memory card 170, and the cloud service 110B is registered in the table so as to be associated with a host device 140' (not shown) and the memory card 170. In this case, when the connection destination of the memory card 170 is changed from the host device 140 to the host device 140', the transmission destination of a file is automatically changed from the cloud service 110A to the cloud service 110B. Similarly, when the connection destination of the memory card 170 is changed from the host device 140' to the host device 140, the transmission destination of a file is automatically changed from the cloud service 110B to the cloud service 110A.

Second Embodiment

In a second embodiment, an example in which a host device controls the wireless communication of a memory card with a transmission destination will be described. In the second embodiment, the difference between the first embodiment and the second embodiment will be mainly described. Components having the same functions as those in the first embodiment are denoted by the same names and reference numerals as those in the first embodiment, and a description thereof will be omitted.

Figure 7:
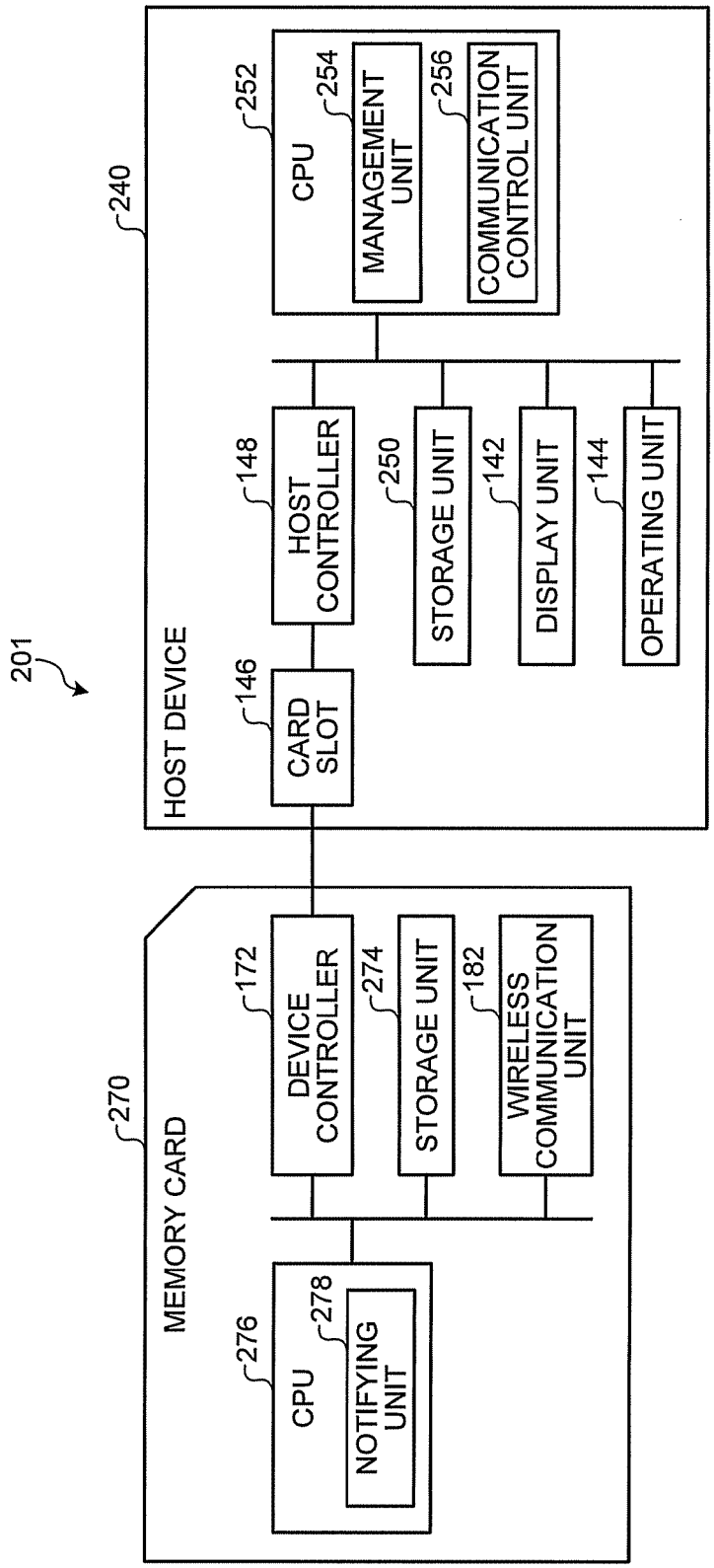
FIG. 7 is a block diagram illustrating an example of the structure of a host device and a memory card according to a second embodiment.

FIG. 7 is a block diagram illustrating an example of the structure of a host device 240 and a memory card 270 in a communication system 201 according to a second embodiment.

As shown in FIG. 7, the differences between the host device 240 and the host device 140 in the first embodiment are a storage unit 250 and a CPU 252.

The storage unit 250 stores a table in which first type information, second type information, and transmission destination information indicating a transmission destination corresponding to the first type information and the second type information are associated with each other.

The CPU 252 includes a management unit 254 and a communication control unit 256.

The management unit 254 receives the second type information of the memory card 270 and determines whether the received second type information is registered in the table of the storage unit 250. Specifically, when the memory card 270 is inserted into the card slot 146 of the host device 240, the management unit 254 receives the second type information of the memory card 270 from the memory card 270 through the card slot 146 and the host controller 148.

When the second type information of the memory card 270 has not been registered in the table of the storage unit 250, the management unit 254 generates a transmission destination list on the basis of the first type information of the host device 240 and the second type information of the memory card 270. An example of a method of generating the transmission destination list is the same as that in the first embodiment. Then, the management unit 254 displays the generated transmission destination list on the display unit 142. When the user uses the operating unit 144 to select a transmission destination from the transmission destination list displayed on the display unit 142, the management unit 254 registers the transmission destination information indicating the selected transmission destination in the table of the storage unit 250 so as to be associated with the first type information of the host device 240 and the second type information of the memory card 270.

The communication control unit 256 controls the memory card 270 to transmit the file stored in the memory card 270 to the transmission destination corresponding to the type of the host device 240 and the type of the memory card 270 using wireless communication. Specifically, the communication control unit 256 controls the wireless communication unit 182 of the memory card 270 to transmit the file which is stored in the memory card 270 by the host device 240 to the transmission destination indicated by the transmission destination information which corresponds to the first type information of the host device 240 and the second type information of the memory card 270 using wireless communication.

As shown in FIG. 7, the differences between the memory card 270 and the memory card 170 in the first embodiment are a storage unit 274 and a CPU 276.

The CPU 276 includes a notifying unit 278.

The notifying unit 278 notifies the host device 240 of the second type information of the memory card 270. Specifically, when the device controller 172 detects the insertion of the memory card 270 into the card slot 146 of the host device 240, the notifying unit 278 reads the second type information of the memory card 270 from the storage unit 274 and notifies the host device 240 of the second type information through the device controller 172.

Figure 8:
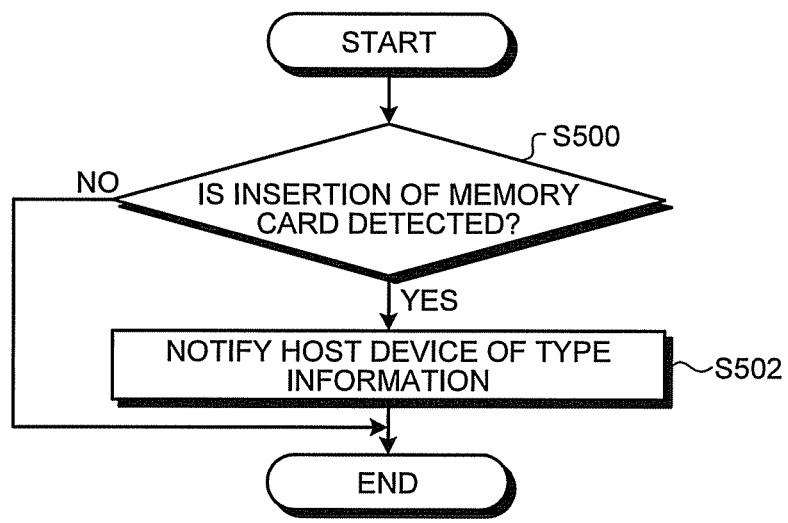
FIG. 8 is a flowchart illustrating an example of a notification process of the memory card according to the second embodiment.

FIG. 8 is a flowchart illustrating an example of the flow of a notification process performed by the memory card 270 according to the second embodiment.

First, when the memory card 270 is inserted into the card slot 146 of the host device 240, the device controller 172 detects the insertion of the memory card 270 (Step S500).

When the insertion of the memory card 270 is detected (Yes in Step S500), the notifying unit 278 notifies the host device 240 of the second type information of the memory card 270 through the device controller 172 (Step S502).

In contrast, when the insertion of the memory card 270 is not detected (No in Step S500), the notifying unit 278 does not perform Step S502.

Figure 9:
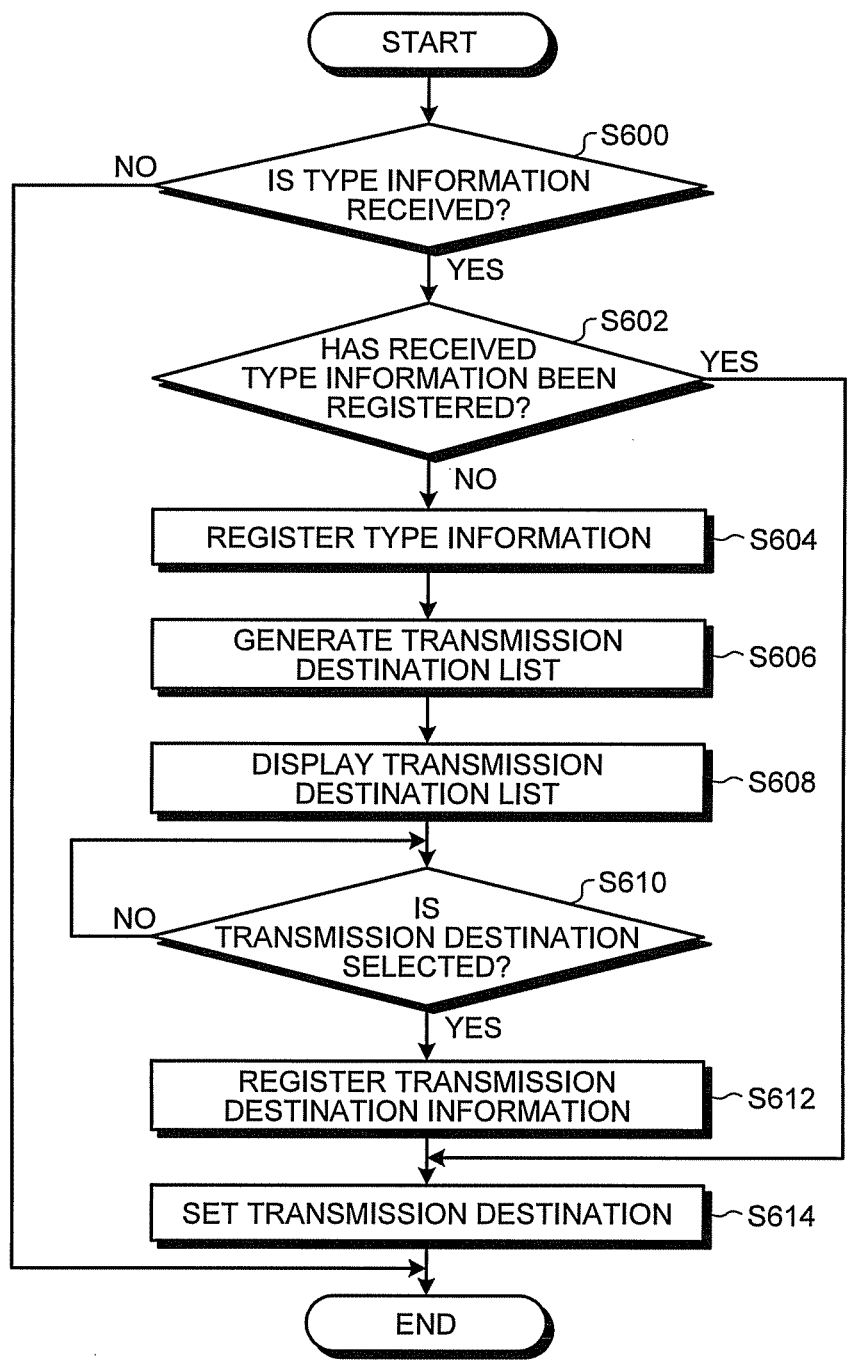
FIG. 9 is a flowchart illustrating an example of a registration process of the host device according to the second embodiment.

FIG. 9 is a flowchart illustrating an example of the flow of a registration process preformed by the host device 240 according to the second embodiment.

First, when receiving the second type information of the memory card 270 from the memory card 270 through the card slot 146 and the host controller 148 (Yes in Step S600), the management unit 254 determines whether the received second type information has been registered in the table of the storage unit 250 (Step S602).

When the received second type information has not been registered in the table of the storage unit 250 (No in Step S602), the management unit 254 stores the received second type information and the first type information of the host device 240 in the table of the storage unit 250 so as to be associated with each other (Step S604). In contrast, when the received second type information has been registered in the table of the storage unit 250 (Yes in Step S602), the process proceeds to Step S614.

Then, the management unit 254 generates a transmission destination list on the basis of the first type information and the second type information registered in the table of the storage unit 250 (Step S606) and displays the generated transmission destination list on the display unit 142 (Step S608).

Then, the management unit 254 waits for the user to select a transmission destination from the transmission destination list displayed on the display unit 142 using the operating unit 144 (No in Step S610). When the user uses the operating unit 144 to select a transmission destination (Yes in Step S610), the management unit 254 registers the transmission destination information indicating the selected transmission destination in the table of the storage unit 250 so as to be associated with the first type information of the host device 240 and the second type information of the memory card 270 (Step S612).

Then, the communication control unit 256 notifies the relay server 120 of the transmission destination indicated by the transmission destination information which corresponds to the first type information of the host device 240 and the second type information of the memory card 270 through the memory card 270, the wireless link 107, the wireless base station 130, and the Internet 106 and sets transmission to the cloud service 110 (Step S614).

When the first type information of the host device 240 is not received (No in Step S600), the management unit 254 ends the process.

The transmission process of the memory card 270 is the same as that in the first embodiment except that the communication control unit 256 of the host device 240 is a main unit for the transmission process. Therefore, a description thereof will be omitted.

As such, in the second embodiment, it is possible to obtain the same effect as that in the first embodiment.

Modifications

The invention is not limited to the above-described embodiments, but the components of the above-described embodiments may be changed without departing from the scope and spirit of the invention. In addition, a plurality of components according to the above-described embodiments may be appropriately combined with each other to form various structures. For example, some of the components according to the above-described embodiments may be removed. Components according to different embodiments may be appropriately combined with each other.

Modification 1

In each of the above-described embodiments, the file is transmitted to the cloud service that is determined in consideration of the memory card and the host device, but the invention is not limited thereto. For example, in some cases, a plurality of public wireless LAN services is provided. Therefore, the wireless link 107 may perform wireless communication using the public wireless LAN service which is determined in consideration of the memory card and the host device.

In this way, it is possible to perform wireless communication using the public wireless LAN service which is determined in consideration of the host device as well as the memory card. In addition, the user can select a public wireless LAN service from a public wireless LAN service list on the basis of a first public wireless LAN service list corresponding to the host device and a second public wireless LAN service list corresponding to the memory card. Therefore, it is possible to provide a wide selection of public wireless LAN services. Furthermore, it is possible to dynamically change the public wireless LAN service corresponding to the host device and the memory card only by connecting the host device and the memory card. Therefore, it is possible to reduce the work load of the user.

Modification 2

In each of the above-described embodiments, a file is uploaded to the cloud service through the file relay server. However, a file may be directly uploaded to the cloud service without passing through the relay server.

A communication control program executed by the communication device and the host device according to each of the above-described embodiments is incorporated into, for example, a ROM and is then provided.

The communication control program executed by the communication device and the host device according to each of the above-described embodiments may be stored in a computer that is connected to a network, such as the Internet, may be downloaded through the network, and may be provided. In addition, the communication control program executed by the communication device and the host device according to each of the above-described embodiments may be provided or distributed through a network, such as the Internet.

The communication control program executed by the communication device and the host device according to each of the above-described embodiments may be stored as a file of an installable format or an executable format on a computer-readable storage medium, such as a CD-ROM, a CD-R, a memory card, a DVD, or a flexible disk (FD), and then provided.

The communication control program executed by the communication device and the host device according to each of the above-described embodiments has a module structure for implementing each of the above-mentioned units on a computer. As the actual hardware, a CPU reads the program from an HDD or an NVRAM onto a RAM and executes the program. Then, each of the above-mentioned units is implemented on the computer.

As described above, according to each embodiment, it is possible to transmit the file stored in the communication device by the host device to the transmission destination which is determined in consideration of the host device as well as the communication device.

While certain embodiments have been described, these embodiments have been presented by way of example only, and are not intended to limit the scope of the inventions. Indeed, the novel communication device, host device, communication control method, and communication control program described herein may be embodied in a variety of other forms; furthermore, various omissions, substitutions and changes in the form of the communication device, host device, communication control method, and communication control program described herein may be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is connected to a host device, comprising:
    a wireless communication unit;
    a table storage unit configured to store therein a table in which first type information indicating a type of the host device, second type information indicating a type of the communication device, and transmission destination information indicating a transmission destination corresponding to the first type information and the second type information are associated with each other;
    a processor configured to receive the first type information of the host device and determine whether the received first type information is registered in the table; and
    a the processor further configured to control the wireless communication unit, wherein when the received first type information is registered in the table, the processor controls the wireless communication unit to transmit a file, which is stored in a storage unit of the communication device by the host device, to the transmission destination indicated by the transmission destination information which corresponds to the first type information of the host device and the second type information of the communication device using wireless communication.

2. The communication device according to claim 1, wherein, when the received first type information is not registered in the table, the processor generates a transmission destination list on the basis of the first type information of the host device and the second type information of the communication device, transmits the transmission destination list to the host device, receives, from the host device, transmission destination information indicating a transmission destination which is selected from the transmitted transmission destination list by the host device, and registers the received transmission destination information in the table so as to be associated with the first type information of the host device and the second type information of the communication device, and
    the processor controls the wireless communication unit to transmit the file to the transmission destination indicated by the transmission destination information which corresponds to the first type information of the host device and the second type information of the communication device using wireless communication.

3. The communication device according to claim 2, wherein the processor acquires a first transmission destination list corresponding to the first type information of the host device and a second transmission destination list corresponding to the second type information of the communication device and adds the transmission destinations included in the acquired first and second transmission destination lists to generate the transmission destination list.

4. The communication device according to claim 2, wherein the processor acquires a first transmission destination list corresponding to the first type information of the host device and a second transmission destination list corresponding to the second type information of the communication device and extracts the transmission destinations included in both the acquired first transmission destination list and the acquired second transmission destination list to generate the transmission destination list.

5. The communication device according to claim 3, wherein, in the first transmission destination list and the second transmission destination list, the transmission destination is associated with priority, and
    the processor generates the transmission destination list of the transmission destinations with a predetermined priority or higher.

6. The communication device according to claim 3, wherein the processor authenticates the received first type information of the host device, and
    when the authentication succeeds, the processor generates the transmission destination list using the first transmission destination list.

7. The communication device according to claim 1, wherein, when the communication device is connected to the host device, the processor receives the first type information of the host device.

8. A host device that is connected to a communication device, comprising:
    a table storage unit configured to store therein a table in which first type information indicating a type of the host device, second type information indicating a type of the communication device, and transmission destination information indicating a transmission destination corresponding to the first type information and the second type information are associated with each other;
    a processor configured to receive the second type information of the communication device and determine whether the received second type information is registered in the table; and
    the processor further configured to control the communication device, wherein when the received second type information is registered in the table, the processor controls the communication device to transmit a file to be stored in the communication device to the transmission destination indicated by the transmission destination information which corresponds to the first type information of the host device and the second type information of the communication device using wireless communication.

9. The host device according to claim 8,
wherein, when the received second type information is not registered in the table, the processor generates a transmission destination list on the basis of the first type information of the host device and the second type information of the communication device, displays the transmission destination list on a display unit, and registers the transmission destination information indicating a transmission destination which is selected from the displayed transmission destination list in the table so as to be associated with the first type information of the host device and the second type information of the communication device, and
the processor controls the communication device to transmit the file to the transmission destination indicated by the transmission destination information which corresponds to the first type information of the host device and the second type information of the communication device using wireless communication.

10. The host device according to claim 9,
wherein the processor acquires a first transmission destination list corresponding to the first type information of the host device and a second transmission destination list corresponding to the second type information of the communication device and adds the transmission destinations included in the acquired first and second transmission destination lists to generate the transmission destination list.

11. The host device according to claim 9,
wherein the processor acquires a first transmission destination list corresponding to the first type information of the host device and a second transmission destination list corresponding to the second type information of the communication device and extracts the transmission destinations included in both the acquired first transmission destination list and the acquired second transmission destination list to generate the transmission destination list.

12. The host device according to claim 10,
wherein, in the first transmission destination list and the second transmission destination list, the transmission destination is associated with priority, and
the processor generates the transmission destination list of the transmission destinations with a predetermined priority or higher.

13. The host device according to claim 10,
wherein the processor authenticates the received second type information of the communication device, and
when the authentication succeeds, the processor generates the transmission destination list using the second transmission destination list.

14. The host device according to claim 8,
wherein, when the host device is connected to the communication device, the processor receives the second type information of the communication device.

15. A communication control method that is performed in a communication device connected to a host device, the method comprising:
receiving first type information indicating a type of the host device;
determining whether the received first type information is registered in a table in which first type information of the host device, second type information indicating a type of the communication device, and transmission destination information indicating a transmission destination corresponding to the first type information and the second type information are associated with each other; and
when the received first type information is registered in the table, transmitting a file, which is stored in a storage unit of the communication device by the host device, to the transmission destination indicated by the transmission destination information which corresponds to the first type information of the host device and the second type information of the communication device using wireless communication.

16. A communication control method that is performed in a host device connected to a communication device, comprising:
receiving second type information indicating a type of the communication device;
determining whether the received second type information is registered in a table in which first type information indicating a type of the host device, second type information of the communication device, and transmission destination information indicating a transmission destination corresponding to the first type information and the second type information are associated with each other; and
when the received second type information is registered in the table, controlling the communication device to transmit a file to be stored in the communication device to the transmission destination indicated by the transmission destination information which corresponds to the first type information of the host device and the second type information of the communication device using wireless communication.

17. A computer program product comprising a non-transitory computer readable medium including programmed instructions, wherein the instructions, when executed by a computer of a communication device connected to a host device, cause the computer to perform:
receiving first type information indicating a type of the host device;
determining whether the received first type information is registered in a table in which first type information of the host device, second type information indicating a type of the communication device, and transmission destination information indicating a transmission destination corresponding to the first type information and the second type information are associated with each other; and
when the received first type information is registered in the table, transmitting a file, which is stored in a storage unit of the communication device by the host device, to the transmission destination indicated by the transmission destination information which corresponds to the first type information of the host device and the second type information of the communication device using wireless communication.

18. A computer program product comprising a non-transitory computer readable medium including programmed instructions, wherein the instructions, when executed by a computer of a host device connected to a communication device, cause the computer to perform:
receiving second type information indicating a type of the communication device;
determining whether the received second type information is registered in a table in which first type information indicating a type of the host device, second type information of the communication device, and transmission destination information indicating a transmission destination corresponding to the first type information and the second type information are associated with each other; and when the received second type information is registered in the table, controlling the communication device to transmit a file to be stored in the communication device to the transmission destination indicated by the transmission destination information which corresponds to the first type information of the host device and the second type information of the communication device using wireless communication.

* * * * *